April 8, 1941.  S. C. CARNEY  2,237,386
METHOD OF RECOVERING HYDROCARBONS
Filed Dec. 21, 1937  2 Sheets-Sheet 1

INVENTOR.
SAMUEL C. CARNEY

April 8, 1941.  S. C. CARNEY  2,237,386
METHOD OF RECOVERING HYDROCARBONS
Filed Dec. 21, 1937   2 Sheets-Sheet 2

INVENTOR.
SAMUEL C. CARNEY
BY
ATTORNEYS.

Patented Apr. 8, 1941

2,237,386

UNITED STATES PATENT OFFICE 2,237,386

METHOD OF RECOVERING HYDROCARBONS

Samuel C. Carney, Bartlesville, Okla., assignor to Phillips Petroleum Company, a corporation of Delaware Application December 21, 1937, Serial No. 181,041

3 Claims. (Cl. 183—114.6)

This invention relates to improvements in absorption cycles such as are used in the recovery of components from hydrocarbon gas consisting of a plurality of components of different volatility.

In the process of the present invention the pentane and heavier constituents together with enough butane to comprise a commercial natural gasoline are dissolved not in the entire large absorption oil stream initially fed to the absorbers but instead in that small part of the originally large stream which completes the flow through the entire absorbing apparatus, the remainder of the absorption oil being taken from the absorbers at an intermediate point and fed back to the initial point after venting or flashing. Thus the absorption cycle comprises a plurality of sections, each succeeding section in the direction of absorption oil flow having a lesser amount of absorption oil circulating therein, with a portion of the oil being taken from each section, flashed, and fed back to the initial section. That portion of absorption oil that completes the flow is taken from the last section to be stripped in the usual still. The product stripped from this last small portion of absorption oil is the commercial natural gasoline mentioned above. The desirable products flashed at the intermediate points in the direction of absorption oil flow are the progressively heavier components from ethane down to butane or mixtures thereof. The flashed products may be put through a desorbing process such as that described in the applicant's co-pending case Serial No. 227,395 filed August 29, 1938 to eliminate the methane or they may be sent to reabsorbers as explained below.

An important object of the invention is to recover in an efficient manner a large proportion of the more volatile components of hydrocarbon gas while still recovering all the less volatile components.

It is to be understood that the process is adapted for use with any gas which comprises a plurality of components of different volatility.

It is further to be understood that in the following specification where total absorption of a component is mentioned, commercially complete recovery is referred to, the process being asymptotic in character.

Figure 1:
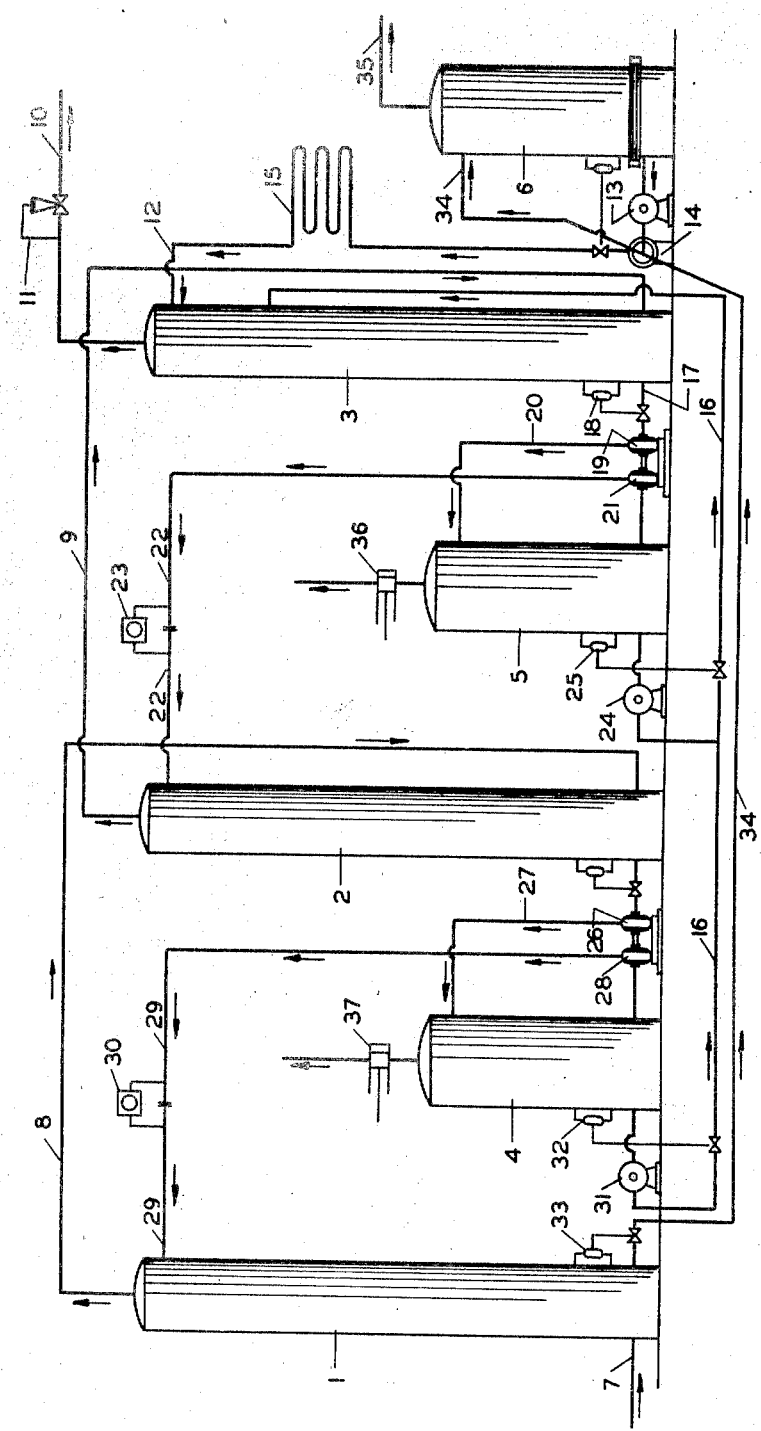
Figure 2:
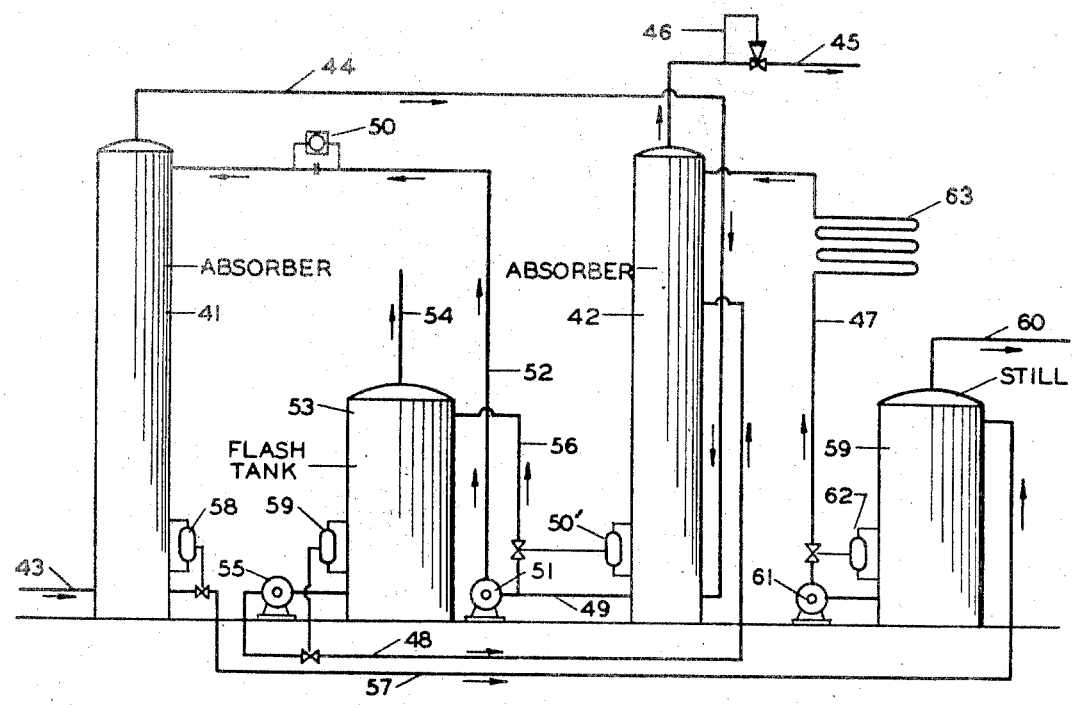
Figure 3:
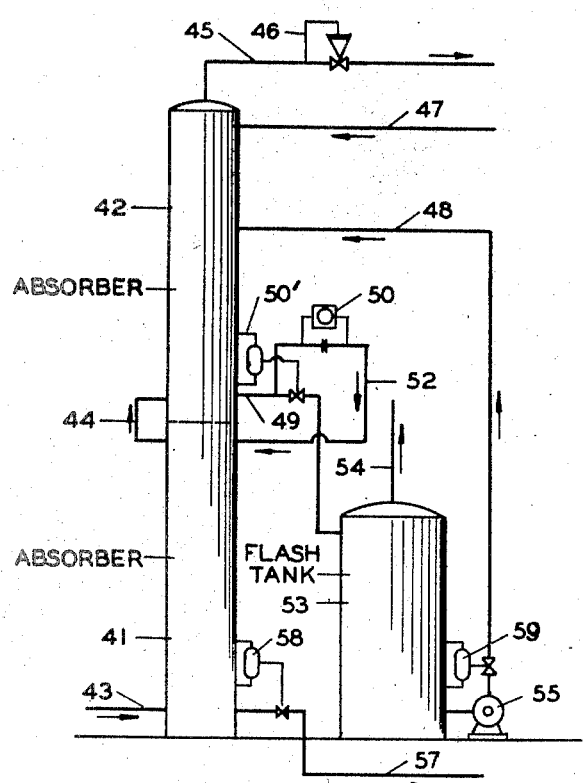

In the accompanying drawings forming a part of this specification,

Figs. 1, 2 and 3 show diagrammatic views of absorption systems embodying the applicant's invention.

Referring to Fig. 1, my cycle is arranged as follows:

Three absorbers 1, 2 and 3 are arranged in countercurrent series as to gas and oil flow. Numerals 4 and 5 represent either conventional flash tanks or stripping columns as known in the art wherein volatile dissolved material is removed from the oil by reduction in pressure which may, as is well known, be aided by use of a lighter stripping vapor derived from flashing at higher pressure of the same oil in apparatus not shown. At 6 is represented any type of still in which oil is thoroughly denuded by use of heat and/or steam. The cycle may be operated at any practical pressure.

Rich gas enters at 7, flows through 1, by pipe 8 to 2, by pipe 9 to 3, through 3, and residue gas leaves by pipe 10, the pressure on entire system being controlled by regulator 11. It is the function of absorber 1 to absorb pentane and heavier with substantial completeness and, as known, if this be done, there will incidentally be absorbed here a part of the butane sufficient when treating typical gas supplies to make when finished as usual, the commercial grade of natural gasoline known as 26#. It is the function of absorber 2 to absorb the remaining butane with substantial completeness, other lighter materials also being absorbed incidentally. It is the function of absorber 3 to absorb the remaining propane with substantial completeness, other lighter materials again being incidentally absorbed.

Oil enters the cycle at two or three points in absorber 3. Through line 12 a stream of distilled oil enters at the top plate which is thoroughly denuded by distillation in still 6 from which it is pumped by pump 13 and cooled by passage through heat exchanger 14 and cooler 15. At a lower plate a much larger stream of oil which has been denuded by flashing enters through pipe 16. The sum of these two streams I will refer to as the original oil rate and this original rate is sufficient for example to recover substantially all the propane from the gas flowing through absorber 3. This rate, though, may be either greater or less than required for complete propane absorption.

The combined streams of oil flow downward and pass out the base through pipe 17 as controlled by level control 18. The oil passes through hydraulic turbine 19 and pipe 20 into flash stripping apparatus 5. Here dissolved materials are removed by flashing and vapor stripping as known. Turbine 19 drives pump 21 which pumps through pipe 22 as controlled by flow controller 23 a part of the oil, usually about one-third, which is sufficient to absorb from the gas passing through absorber 2 substantially all the butane. Though raising pressure on this part of the oil is shown as being done by turbine driven pump, this is not essential and any type of pump and drive is fully equivalent. The remainder of the flashed oil from unit 5 is delivered by pump 24, controlled by level control 25, into pipe 16, thus completing its part of the cycle.

That part of the oil entering absorber 2 through pipe 22 flows downward through 2 and in a similar manner flows through turbine 26 and pipe 27 into flash stripping unit 4. From unit 4 a fraction of the oil entering it, again about one-third, is pumped by pump 28 through pipe 29 as controlled by flow controller 30 and enters the top of absorber 1. This amount is regulated, as known in the art, so as to be enough to recover with substantial completeness all the pentane and heavier from the gas flowing through absorber 1. The remainder of the oil is pumped from 4 by pump 31, controlled by level control 32, also into pipe 16 where it joins the oil pumped into pipe 16 from flash unit 5, these two streams going together back to absorber 3 and completing their part of the cycle. It is to be understood that flashed oil from 4 and 5 might be delivered separately to absorber 3, that from 5 being more thoroughly denuded, by pipe 16 and that from 4 at a lower plate.

The twice reduced oil stream entering 1 by pipe 29, thus amounting to roughly one-ninth of the total initially entering absorber 3, flows down absorber 1 and is delivered by level control 33 through pipe 34 through heat exchanger 14, to still 6. All handling of oil from 1 and its distillation are as known in the art. Vapor from still 6 through pipe 35 goes to a condensing system in the known manner. Thoroughly denuded oil from 6 completes the cycle when it again enters absorber 3 through pipe 12. It is to be noted that the oil entering 3 by pipe 12 is the only part of the original oil stream which makes a cycle through the entire apparatus.

Units 4 and 5 may be operated at low pressure, by the addition of heat, stripping by vapor or any combination of these methods so long as ebullition of the oil is brought about to release the relatively light fractions in solution. They are the same in principle as flashing devices known in the art. It is no part of this invention to improve the known devices or methods used for flashing and stripping. It is a purpose of this invention, instead, to show how to deliver to a flashing device oil commercially free from pentane and heavier and thus better suited to the attainment of substantially complete denuding by the known flashing and vapor stripping methods.

Vapors leaving units 5 and 4 through the discharge of compressors 36 and 37 are left to be treated for condensation of their useful content also by known methods. But by reason of their freedom from pentane and heavier and the freedom of that from 5 from butane and heavier, they are especially suited for treatment by a desorption process for the elimination of methane. Also such vapors are especially well adapted for treatment in reabsorbers which also use the cycle of this disclosure.

The useful obvious variants of using in the series either two absorbers or a number larger than the three used for illustration in Fig. 1 may, of course, be made within the spirit of the invention. A major variant which is not obvious and not known to the art is illustrated in Fig. 2 which illustrates for convenience using two absorbers in series, but is not thus limited, for it may advantageously be used on a larger number or between part of the arbsorbers of a larger series and not the others.

In Fig. 2 two absorbers 41 and 42 are arranged in countercurrent series. Two absorbers have been shown for convenience in illustrating although it is obvious that several absorbers could be used depending on the number of flashings desired. Rich gas enters through pipe 43, passes upward through 41, and is delivered by pipe 44 to the base of 42. It passes upward through 42 and residue leaves the system by pipe 45 as controlled by regulator 46, which governs the pressure on the entire system.

Lean oil enters the cycle through pipes 47 and 48, 47 delivering oil thoroughly stripped by distillation to the top plates of 42, and 48 delivering oil stripped by flashing with or without heating to a lower plate of 42. Oil from both streams passes downward through absorber 42 and leaves its base through pipe 49. A part of the oil amounting to approximately one-third of the total is diverted as controlled by flow controller 50, is slightly raised in pressure by pump 51 and delivered through pipe 52 to absorber 41 without any flashing or other reduction in its dissolved content. It will be noted that herein lies the major difference in this process over that of Fig. 1. The remaining approximate two-thirds of the oil stream as controlled by level controller 50', flows to the flash or flash stripping device 53 in which its dissolved content is removed with the greatest practical thoroughness, the vapors so removed leaving 53 by pipe 54 for further treatment as known. The oil so flashed is pumped from 53 by pump 55 as controlled by level control 59 into pipe 48 which returns it to absorber 42, completing its part of the cycle.

The entirely undenuded oil from absorber 42 which enters 41 through pipe 52 passes downward through 41 and is delivered through pipe 57 as controlled by level control 58 to still 59. Still 59 represents any known still for thorough stripping of such oil together with any or all known appurtenances of such stills such as heat exchangers, vent tanks, desorbers and the like and the vapors removed by still 59 pass by pipe 60 to the known condensing and fractionating system. Thoroughly denuded oil from still 59 is pumped by pump 61 governed by level control 62 into pipe 47, is cooled in cooler 63 and delivered to the top plate of absorber 42 thus completing its course throughout the cycle. It is noted especially that this approximately one-third of the initial oil flow did not pass through the flash stripping device 53.

Fig. 3 illustrates how the two absorbers as just described may be set one above the other with elimination of pump 51, its function being taken by gravity, and general shortening of all connecting piping. This is a mere mechanical rearrangement.

It has been stated above that approximately two-thirds of the oil stream should be "fed back" to the beginning of the oil cycle after each successive absorption contact. The reason is that the absolute vapor pressure of each heavier component is approximately one-third as great as that of the next lighter. The truth of this is most accurately expressed by use of the equilibrium constants K. Thus:

*Tabulation 1*

|  | K 250# 80° F. | Ratio | K 100# 80° F. | Ratio | K 500# 80° F. | Ratio |
|---|---|---|---|---|---|---|
| Methane | 14.4 | 6.6 | 36 | 7.2 | 7.4 | 6.05 |
| Ethane | 2.18 | 3.41 | 5 | 3.45 | 1.22 | 3.13 |
| Propane | .64 | 2.87 | 1.45 | 2.96 | .39 | 2.69 |
| Butane | .223 | 3.23 | .49 | 3.38 | .145 | 2.9 |
| Pentane | .069 | 2.56 | .145 | 2.64 | .05 | 2.5 |
| Hexane | .027 |  | .055 |  | .02 |  |

The above tabulation indicates by the best method generally known in the art, the tendency of various hydrocarbons to escape from solution by showing in the columns headed "K" the ratio between the molar concentration in the gas and that in the liquid at equilibrium, at the temperature and absolute pressure shown. In alternate columns are shown the ratios at these same conditions of the "K's" themselves, the ratios given being between the "K" for a given paraffin and the one next heavier. Thus the "K" for propane at 100 pounds absolute and 80° F. is 2.96 times that for normal butane at the same conditions. And it is these "K" ratio figures for ethane and heavier which indicate that the oil proceeding to the next contact should be roughly one-third that of the former contact. Although it is the fact that there is no exact agreement in the art as to the numerical values of these "K's" there is a general agreement as to their significance, and these values are used only for illustration. In the case of methane, it is fortunate for my process that this "K" ratio is not approximately 1 to 3 but is instead 1 to 6 or 1 to 7, for one does not wish to absorb methane. But the ratios of the "K's" for ethane and heavier are my reasons for heretofore using the round figure of one-third of the oil stream sent ahead and two-thirds "fed back." Attention is called to the fact that these ratios are reasonably similar at the widely different pressures of 100, 200 and 500 pounds absolute. But since, as generally known, all such figures are merely the best approximations currently known, the best definition of the oil to be sent ahead is that amount which will, with commercial thoroughness, recover the single component or commercial combination of components for which it is selected, as judged by test in the gas leaving that absorber.

The following tabulation carries forward further the illustration, using on an actual rich gas (Oklahoma City) the known method of "Absorption factors" which are the quotients of the molar rates of oil circulation divided by the "K" of the component.

*Tabulation 2*

|  | Mol. fract. | K 250# 80° F. | A5 | A4 | A3 | A2 |
|---|---|---|---|---|---|---|
| Methane | .793 | 14.4 | .0067 | .0218 | .062 | .212 |
| Ethane | .109 | 2.18 | .044 | .143 | .41 | 1.4 |
| Propane | .055 | .64 | .151 | .44 | 1.4 | 4.77 |
| Butane | .023 | .223 | .433 | 1.4 | 4.02 | 13.69 |
| Pentane | .011 | .069 | 1.4 | 4.52 | 12.98 | 44.21 |
| Hexane | .009 | .027 | 3.58 | 11.57 | 33.22 | 113.17 |
|  | 1.000 |  |  |  |  |  |

It is known in the art today that a large oil circulation is required to absorb a lighter component and this tabulation only gives to this long known fact numerical values. It is considered in the art of today that an oil rate which will give an absorption factor of 1.4 for a component when used in a practical absorber of 12 "Theoretical plates" will give commercially complete recovery of that component, and a lesser recovery of lighter ones as indicated by their factors. This implies, however, as generally stated today, that the oil in question be "thoroughly denuded." This really means thoroughly denuded with respect to the single component under consideration. It was stated by Kremser in 1930, "The absorption of each constituent is substantially independent of all other constituents," also "The driving force is the difference between the partial pressure of a constituent in the gas and the vapor pressure of that constituent in the liquid," and, "The vapor pressure is the only physical property affecting the absorption factor."

These statements mean with reference to my present cycle that propane in the oil, if at equilibrium with the gas, entirely prevents further absorption of propane but such propane merely counts as part of the solvent and thus aids slightly in absorption of butane, and the same for butane in the oil with respect to absorption of pentane and heavier. But as concentration of a component in the oil increases, solution of that component from the gas will decrease. At equilibrium, where vapor pressure of that component in the oil equals its partial pressure in the gas no movement of that component will occur from gas to liquid phase. While if its vapor pressure in the oil increases further, or its partial pressure in the gas in the next absorber be less (as in the illustrative case) the reverse movement of that component from liquid to gas phase, (desorption or stripping) will occur.

As tabulated, a factor of 1.4 for butane gives the unnecessarily large factor of 4.52 for pentane while a factor of 1.4 for propane gives the oversize factors of 4.02 for butane and 12.98 for pentane. Herein lies the reason for the historic failure of flashing processes. For the butane and pentane when dissolved in such large amounts of oil were only slightly removed by flashing even at very low pressures, and on the next use of such partly denuded oil, their absorption factor was greatly reduced.

My process, recognizing the truth of this principle, avoids such large absorption factors for heavy constituents of the gas. Flashing in the prior art, for reasons inherent in the materials themselves, also avoided them. It avoided them by unwillingly building up a concentration of those components which had a large absorption factor, in practically direct proportion to these factors, since the one with the largest absorption factor is most difficult to flash. With such poorly denuded oil, no matter how great its volume, the absorption factors for components in it will come down to the standard 1.4 or even below.

My process, on the contrary, keeps these factors normal for the heavy components by a progressive reduction in the volume of the oil itself. In the large amount of oil necessary to give a factor of 1.4 for propane, I leave no large unused empty space to fill up with pentane and heavier.

As has been stated above about one-third of the oil stream from the previous absorber is sent to the next and this is roughly true. However, there is no virtue in the figure one-third. Technically what is to be sent further into the cycle is such an amount of oil, considering its composition, as will give the proper absorption factor for the material to be absorbed in the next absorber.

For example, since even with butane there may be, with simple flashing, a harmful build up in the "feed back" oil, it may in some cases be desirable to absorb not only all the pentane but also all the butane in the first absorber. In such a case use of one-third of the previous oil would not be enough and the designer and operator have the choice between a more thorough flashing operation, and the sending on of a larger amount of oil to undergo the complete distillation.

On the other hand at least some of the prior art, intentionally removed from an oil stream which was used repeatedly, methane and ethane that was not desired before sending it back to another absorber where it would absorb more methane and ethane. At this end of the scale the present process intentionally retains in solution materials which may ultimately be desirable to recover, though not at that point, so that the oil so conditioned will have for them a very low absorption factor or, especially in the case of methane, it may even be desorbed. This forces them to remain in the gas stream until they come to that later absorber in which their complete recovery is desired, so that each component may be substantially, though of course not entirely, concentrated in its intentionally selected stream to the great benefit of subsequent condensation and fractionation steps.

It is well known that rich oil from an absorber will contain some of every component in the gas and that such oil will be substantially in equilibrium with the gas entering that absorber whether the oil entering its top be stripped or not. At first it is difficult to see what difference it makes whether extra lighter materials got into the oil in that particular absorber or in another one somewhere downstream. To see why there is a real difference when using unflashed oil, one must consider first the gas rather than the oil for it is the partial pressure in the gas that determines the composition of the rich oil and it is the gas that moves the butane and propane downstream to the place where they are intended to come out.

Taking the same gas as used in the last tabulation, I show the partial pressures of components in the residue from two absorbers on the assumption that the first removes from the gas only pentane and heavier, the second only butane, and a third only propane and then examine the tabulated partial pressures with which the unstripped oil is in equilibrium, to see whether or not the original assumption was in fact correct.

*Tabulation 3*

|  | Rich gas mols. and p. p. | First absorber residue | | Second absorber residue | |
| --- | --- | --- | --- | --- | --- |
|  |  | Mols. | P. p. | Mols. | P. p. |
| Methane | .793 | .793 | .8092 | .793 | .8286 |
| Ethane | .109 | .109 | .1112 | .109 | .1139 |
| Propane | .055 | .055 | .0561 | .055 | .0575 |
| Butane | .023 | .023 | .0235 |  |  |
| Pentane | .011 |  |  |  |  |
| Hexane | .009 |  |  |  |  |
|  | 1.00 | .98 | 1.00 | .957 | 1.00 |

It will be plain from this tabulation that oil from a third absorber is in equilibrium with residue from absorber 2. Obviously it cannot in the second absorber absorb methane, ethane or propane, for it is saturated with these by a gas with the higher partial pressures of the second absorber residue whereas the rich gas entering the second absorber is the residue from the first absorber having a lower partial pressure of each of these three components. But it can absorb the butane and does so. Now when one-third the oil in equilibrium with the first absorber residue is sent to this same absorber, it cannot absorb any butane or lighter from the rich gas because the partial pressures of these four components in the rich gas are all lower. Therefore it absorbs the pentane and heavier.

In this tabulation I have, of course, assumed, contrary to fact, constant temperature and pressure in all absorbers. The tabulation shows desorption of all lighter components which will of course be reduced by the actually slightly higher operating pressure of the upstream absorbers with respect to gas. The effect of temperature difference is uncertain, depending on whether the gas is warmer than the oil or vice-versa.

It is difficult to see the difference between using flashed or unflashed oil in the first and second absorbers before examining a tabulation of partial pressures if using fully denuded oil in these. In this tabulation is used the absorption factors A5 and A4 from Tabulation 2.

*Tabulation 4*

|  | Rich gas mols. and p. p. | First absorber residue | | | Second absorber residue | | |
| --- | --- | --- | --- | --- | --- | --- | --- |
|  |  | Percent | Mols. | P. p. | Percent | Mols. | P. p. |
| Methane | .793 | .9933 | .7877 | .8281 | .9772 | .7697 | .8698 |
| Ethane | .109 | .956 | .1040 | .1093 | .8570 | .0891 | .1007 |
| Propane | .055 | .849 | .0467 | .0490 | .5600 | .0261 | .0295 |
| Butane | .023 | .567 | .0130 | .0136 |  |  |  |
| Pentane | .011 |  |  |  |  |  |  |
| Hexane | .009 |  |  |  |  |  |  |
|  |  |  | .9514 | 1.00 |  | .8849 | 1.00 |

Now to compare Tabulations 3 and 4. In Tabulation 3 there is a down stream increase over the rich gas, in the partial pressures of everything present in the two residues. This means a higher saturation of oil and therefore better flashing and more concentrated vapors from the flash. Furthermore since in each residue the percentage increase in partial pressure for each component is the same, the gas desorbed from the oil and returning to the down stream absorbers will make these gases even richer in components heavier than methane than shown. Constituents unabsorbed in early contacts constitute thus a favorable build up in the gas phase as contrasted with the unfavorable build up in the oil of the prior art.

In Tabulation 4, is shown a down stream decrease in partial pressure of everything but methane, the decrease being especially large with respect to propane and butane. So that though it is true that the process of Fig. 1 recovers more for a given oil flow, the process of Fig. 2 might be preferred because it enriches the vapors and puts most of each poly feed component into its own selected stream. Also this concentrating effect is greater for methane than for ethane, greater for ethane than for propane and greater for propane than for butane, this being in the order of the difficulty of their condensation, where concentration is most useful.

Based on the tabulations shown, the approximate compositions of vapors from the propane flash and the butane flash with gas of the illustration and 250 pounds operating pressure are as follows:

PROPANE FLASH

|  | Fig. 1 process | Fig. 2 process | Percent change |
|---|---|---|---|
| Methane | .432 | .33 | −23.5 |
| Ethane | .332 | .30 | −9.5 |
| Propane | .236 | .37 | +56.5 |
|  | 1.00 | 1.00 |  |

BUTANE FLASH

|  | Fig. 1 process | Fig. 2 process | Percent change |
|---|---|---|---|
| Methane | .262 | .215 | −18.0 |
| Ethane | .228 | .195 | −14.5 |
| Propane | .313 | .302 | −3.5 |
| Butane | .197 | .288 | +46.5 |
|  | 1.00 | 1.00 |  |

TOTAL VAPORS BOTH FLASHES

|  | Fig. 1 process | Fig. 2 process | Percent change |
|---|---|---|---|
| Methane | .374 | .29 | −22.5 |
| Ethane | .294 | .264 | −10 |
| Propane | .262 | .346 | +32 |
| Butane | .07 | .10 | +43 |
|  | 1.00 | 1.00 |  |

This is given to show that while propane and butane are still far from being delivered separately, there is a very important concentration of them, which by further absorption and desorption steps will contribute greatly to solution of the problem of rectification of poly feed.

In the appended claims, it is to be understood that the term "first absorption zone" can refer to any absorption zone of a series and the term "second absorption zone" can refer to any other absorption zone of the series down stream of the gas.

I claim:

1. In a process for treating hydrocarbon gas having components of different volatility, comprising passing a stream of said gas through first and second absorption zones in series, contacting said gas in said second zone with a stream of absorption liquid sufficient to absorb the more volatile desirable components of said gas, diverting a portion of said liquid stream, contacting the gas in said first absorption zone with the undiverted portion of said stream of absorption liquid, the undiverted portion of said stream of absorption liquid being sufficient to absorb the less volatile components of said gas, denuding said undiverted stream of absorption liquid, recycling the denuded liquid to a point in said second absorption zone, and recycling said diverted liquid to said second absorption zone at a point upstream with respect to said gas relative to said point at which said denuded liquid is admitted.

2. In a process for treating hydrocarbon gas containing a more readily liquefiable fraction and a less readily liquefiable fraction the steps comprising first contacting the gas with an absorption liquid saturated with respect to the less readily liquefiable fraction in a first absorption zone to absorb the more readily liquefiable fraction from the gas, then contacting the gas with an absorption liquid denuded with respect to the less readily liquefiable fraction in a second absorption zone to absorb the same from the gas, the absorption liquid in the first zone consisting of a minor fraction of the liquid effluent of the second absorption zone, distilling the liquid effluent of the first absorption zone to denude the same, flashing the remainder of the liquid effluent of the second absorption zone to release the less readily liquefiable fraction, and passing the denuded absorption liquid and the flashed absorption liquid to the second absorption zone.

3. In a process for treating hydrocarbon gas containing a more readily liquefiable fraction and a less readily liquefiable fraction the steps comprising passing a stream of the gas through a plurality of absorption zones in series, contacting the gas with an absorption liquid saturated with respect to the less readily liquefiable fraction in the first absorption zone relative to gas flow to absorb the more readily liquefiable fraction from the gas, contacting the gas with an absorption liquid denuded with respect to the less readily liquefiable fraction in a subsequent absorption zone relative to gas flow to absorb the less readily liquefiable fraction from the gas, the absorption liquid in each zone consisting of a minor portion of the liquid effluent of the next following absorption zone relative to gas flow, distilling liquid effluent of said first absorption zone to denude the same, flashing the remaining portion of the liquid effluent of said subsequent absorption zone to release the less readily liquefiable fraction, and passing the denuded absorption liquid and the flashed absorption liquid to the last absorption zone of the series relative to gas flow.

SAMUEL C. CARNEY.